US010895974B2

(12) United States Patent
Zhang et al.

(10) Patent No.: US 10,895,974 B2
(45) Date of Patent: Jan. 19, 2021

(54) TOPIC IMAGE FLOWS

(71) Applicant: MICRO FOCUS LLC, Santa Clara, CA (US)

(72) Inventors: Perry Zhang, Shanghai (CN); Yu-Dan Lin, Shanghai (CN); Bing Zhang, Shanghai (CN); Jian-Min Gao, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/637,497

(22) PCT Filed: Aug. 30, 2017

(86) PCT No.: PCT/CN2017/099559
§ 371 (c)(1),
(2) Date: Feb. 7, 2020

(87) PCT Pub. No.: WO2019/041149
PCT Pub. Date: Mar. 7, 2019

(65) Prior Publication Data
US 2020/0218412 A1 Jul. 9, 2020

(51) Int. Cl.
*G06F 3/0485* (2013.01)
*G06F 40/137* (2020.01)
(Continued)

(52) U.S. Cl.
CPC ......... *G06F 3/0485* (2013.01); *G06F 40/137* (2020.01); *G06F 40/169* (2020.01); *G06F 40/30* (2020.01)

(58) Field of Classification Search
CPC .................................................. G06F 3/0485
(Continued)

(56) References Cited

U.S. PATENT DOCUMENTS 6,405,221 B1* 6/2002 Levine ............... G06F 16/9577
715/234
2004/0139400 A1* 7/2004 Allam .................. G06F 40/106
715/201

(Continued)

FOREIGN PATENT DOCUMENTS

| CN | 104267871 A | 1/2015 |
|---|---|---|
| CN | 105786352 A | 7/2016 |
| CN | 106527888 A | 3/2017 |

OTHER PUBLICATIONS

Google; author Unknown; G Suite Updates; Navigate Documents Quickly and Easily With the Outline Tool in Google Docs: https://gsuiteupdates.googleblog.com/2016/03/navigate-documents-quickly-and-easily.html; 5 pages; Mar. 9, 2016.
(Continued)

*Primary Examiner* — William D Titcomb

(57) ABSTRACT

In one example, a system for topic image flows can include a processing resource and a non-transitory computer readable medium having stored thereon instructions to cause the processing resource to generate an image flow of a plurality of topic headers when a user scroll speed of a document including text exceeds a threshold scroll speed, receive a selection of a topic header from the plurality of topic headers, and display, on a user interface, a portion of the document that corresponds to the selected topic header from the plurality of topic headers.

20 Claims, 5 Drawing Sheets

(51) Int. Cl.
*G06F 40/169* (2020.01)
*G06F 40/30* (2020.01)

(58) Field of Classification Search
USPC .......................................................... 715/784
See application file for complete search history.

(56) References Cited

U.S. PATENT DOCUMENTS

| | | |
|---|---|---|
| 2006/0294473 A1 | 12/2006 | Keely |
| 2010/0153889 A1* | 6/2010 | Krause .................. G06F 3/0219 715/856 |
| 2012/0102429 A1* | 4/2012 | Naderi ...................... G06F 8/38 715/783 |
| 2015/0370453 A1 | 12/2015 | Kandekar |
| 2016/0048275 A1 | 2/2016 | Beavers |
| 2016/0117406 A1 | 4/2016 | Agrawal |

OTHER PUBLICATIONS

Janssen, W.C.; ReadUp: A Widget for Reading; http://www2.parc.com/isti/projects/uir/publications/items/UIR-2005-19-Janssen-ReadUp.pdf; Mar. 4, 2005.
Lifewire; Author Unknown; How to Control Your Mac's Cover Flow View Options; https://www.lifewire.com/control-mac-cover-flow-view-options-2260720 ; 25 pages.
Thomas; What is the Average Reading Speed and the Best Rate of Reading?; 1. http://www.healthguidance.org/entry/13263/1/What-is-the-Average-Reading-Speed-and-the-Best-Rate-of-Reading.html; Copyright 2017 Healthguidance.org; 3 pages.
Wikipedia; Reading (Process); 2. https://en.wikipedia.org/wiki/Reading_(process)#Reading_rate; 16 pages.
Wikipedia; Reading (process); https://en.wikipedia.org/wiki/Reading_(process); 2 pages.
Wikipedia; Speed Reading; https://en.wikipedia.org/wiki/Speed_reading; 6 pages.
Wikipedia; Subvocalization; https://en.wikipedia.org/wiki/Subvocalization; 9 pages.
International Search Report and Written Opinion; PCT/CN2017/099559; dated May 29, 2018; 9 Pages.

* cited by examiner

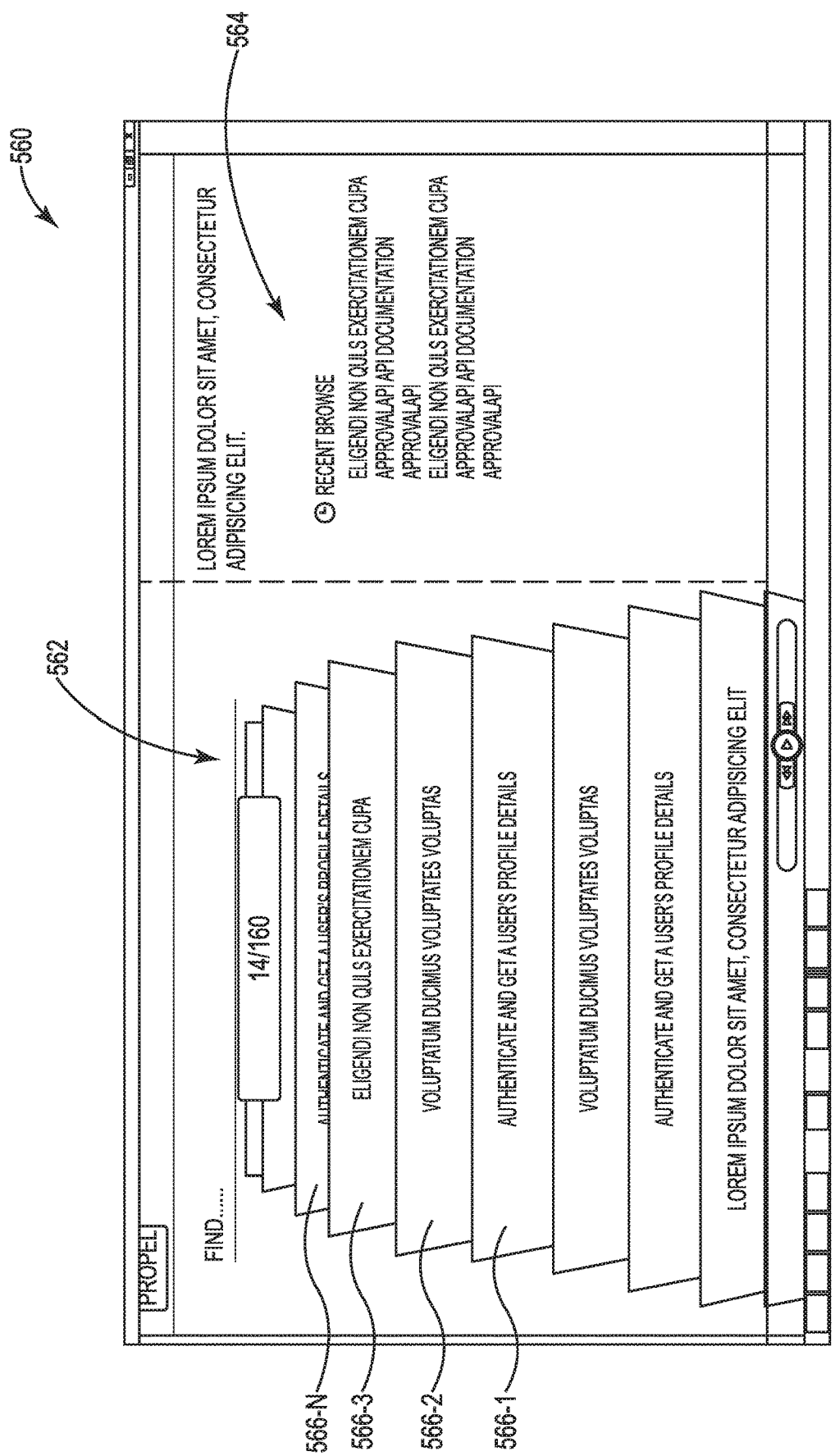

TOPIC IMAGE FLOWS

BACKGROUND

Computing devices can utilize a user interface to display text documents and image documents. The computing devices can include peripheral devices to navigate the text documents and/or image documents. For example, the computing device can be coupled to a computing mouse such that a user can utilize the computing mouse to move the text document from a first line to a second line. In some examples, the peripheral devices can be utilized to display particular portions of the text document and/or image document.

BRIEF DESCRIPTION OF THE DRAWINGS

FIG. 5 illustrates an example of a user interface for topic image flows consistent with the present disclosure.

DETAILED DESCRIPTION

Figure 1:
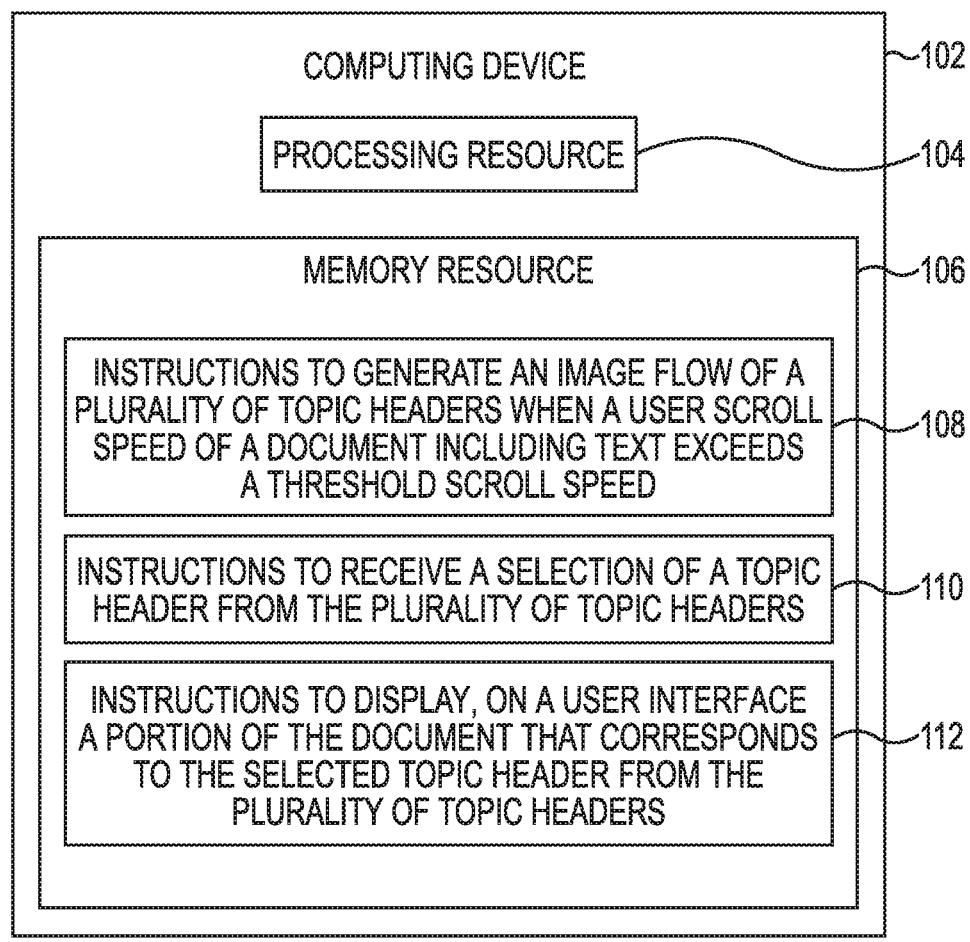
FIG. 1 illustrates an example of a computing device for topic image flows consistent with the present disclosure.

A number of systems, devices, and methods for topic image flows are described herein. In some examples, a system for topic image flows can include a user interface to display a document that includes text, and a computing device coupled to the user interface, wherein the computing device includes instructions to generate an image flow of a plurality of topic headers when a user scroll speed of a document including text exceeds a threshold scroll speed, receive a selection of a topic header from the plurality of topic headers, and display a portion of the document that corresponds to the selected topic from the plurality of topic headers.

The systems, devices, and methods for topic image flows described herein can be utilized to navigate a digital text document (e.g., word document, pdf document, digital document that includes text, web page document, etc.) that is displayed on a user interface of a computing device. In previous systems, a peripheral device can be utilized to scroll through content of the digital text document. However, it can be difficult to navigate relatively larger digital text documents with a plurality of different topics and/or sections. For example, a digital text document with a relatively large quantity of pages can be difficult to navigate to a particular topic and/or section of the digital text. In addition, it can be difficult to navigate between a plurality of topics and/or sections of the digital text.

In some examples, the topic image flow systems, devices, and methods described herein can determine a scroll speed of a displayed digital document to determine whether a user is likely reading text, skimming the text to find a particular section of a topic, and/or fast scrolling to find a different topic. In some examples, these different uses can each have a corresponding scroll speed range and/or scroll speed threshold. For example, a first scroll speed range can be designated for reading and/or comprehending text of the digital document. In this example, the first scroll speed range can be a content refresh velocity that is between 0-30 pixels per second. In some examples, a scroll speed threshold of a content refresh velocity that is greater than 60 pixels per second can indicate that a user is fast scrolling to find a different topic.

In some examples, the topic image flow systems, devices, and methods described herein can determine the scroll speed of the displayed digital document from the background of the digital document. As used herein, determining the scroll speed from the background can include determining the scroll speed without displaying or indicating that the system, device, and/or method is being utilized. For example, the scroll speed and/or other features may not be displayed when the scroll speed is being determined. Determining the scroll speed from the background can reduce distractions from the digital document.

When the scroll speed is within a particular range and/or when the scroll speed exceeds a particular threshold, an image flow of a plurality of topic headers can be generated and displayed on the user interface. In some examples, the plurality of topic headers can be extracted and filtered from the digital document. In some examples, each of the plurality of topic headers are selectable to display the corresponding topic within the digital document. In some examples, the image flow of the plurality of topic headers can return to the background of the digital document and the scroll speed can be monitored to determine when to display the image flow of the plurality of topic headers.

The systems, devices, and methods for topic image flows described herein can be utilized to navigate topics within a digital document without having a table of contents or other resource displayed on the user interface while the digital document is displayed. In addition, the topic image flows can enable a user to more easily navigate a plurality of relatively larger digital documents without relying on features of the plurality of digital documents.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a computing device 102 for topic image flows consistent with the present disclosure. In some examples, the computing device 102 can include a memory resource 106 that can be utilized to store instructions 108, 110, 112 that can be executed by a processing resource 104 to perform functions described herein.

A processing resource 104 may be a central processing unit (CPU), microprocessor, and/or other hardware device suitable for retrieval and execution of instructions stored in memory resource 106. In some examples, the processing resource 104 can be coupled to the memory resource 106 via a connection. The connection can be a physical or wireless communication connection. In the particular example shown in FIG. 1, processing resource 104 may receive, determine, and send instructions 108, 110, 112. As an alternative or in addition to retrieving and executing instructions 108, 110, 112, processing resource 104 may include an electronic circuit comprising a number of electronic components for performing the operations of the instructions 108, 110, 112 in the memory resource 106. With respect to the executable instruction representations or boxes described and shown herein, part or all of the executable instructions 108, 110, 112 and/or electronic circuits included within one box may be included in a different box shown in the figures or in a different box not shown.

Memory resource 106 may be any electronic, magnetic, optical, or other physical storage device that stores executable instructions 108, 110, 112. Thus, memory resource 106 may be, for example, Random Access Memory (RAM), an Electrically-Erasable Programmable Read-Only Memory (EEPROM), a storage drive, an optical disc, and the like. The executable instructions 108, 110, 112 may be stored on the memory resource 106. Memory resource 106 may be a portable, external or remote storage medium, for example, that allows the system to download the instructions 108, 110, 112 from the portable/external/remote storage medium. In this situation, the executable instructions 108, 110, 112 may be part of an "installation package". As described herein, memory resource 106 may be encoded with executable instructions 108, 110, 112 for remote device configurations as described herein.

In some examples, the memory resource 106 can include instructions 108 to generate an image flow of a plurality of topic headers when a user scroll speed of a document including text exceeds a threshold scroll speed. As used herein, an image flow of a plurality of topic headers can include a display of a plurality of images that can be navigated such that a portion of the plurality of images are displayed simultaneously. For example, the image flow of the plurality of topic headers can include a 3D or 2D display of a plurality of cards with a corresponding topic at a top portion or title portion of the plurality of cards. In some examples, each of the plurality of cards can be displayed as a library card type card with a single topic as the title of the card with a brief description or portion of the topic below the topic title of the card. In this way, the image flow of the plurality of topic headers can enable a user to scroll through topics of a digital document as described herein.

The image flow of the plurality of topic headers can be generated by extracting topic information from the digital document. For example, the digital document can include a table of contents or a plurality of headers that can be extracted from the digital document to determine a plurality of topics for the digital document. In this example, the determined plurality of topics can be utilized to generate the image flow. In some examples, the image flow of the plurality of topic headers can be generated for a portion of a plurality of topics within the digital document. For example, a portion of the digital document can be displayed on a user interface. In this example, a topic corresponding to the portion of the digital document can be determined. In this example, the image flow can be generated for a plurality of topics that relate to the topic corresponding to the portion of the digital document displayed. In some examples, extract and filter titles within the digital document that correspond to topics of the digital document. In some examples, the titles within the digital document can be filtered to remove titles that do not relate to a portion of the digital document displayed when the scroll speed exceeded the scroll speed threshold. For example, the plurality of topic headers can be filtered based on a relationship with a particular topic.

In some examples, the image flow of the plurality of topic headers can be displayed on a user interface when the scroll speed of the document exceeds a threshold scroll speed or when the scroll speed is within a particular range. In some examples, the threshold scroll speed can be based on a reading speed of a user, an average words per line of the document, and/or a line height of the document displayed on the user interface. For example, the threshold scroll speed can be calculated utilizing Equation 1 as described herein. In some examples, the scroll speed can be utilized to determine or predict an action of a user. For example, a relatively slow scroll speed (e.g., a content refresh velocity of 0-30 pixels per second, etc.) can indicate that a user is reading to comprehend text or images of the digital document. In addition, a relatively high scroll speed (e.g., a content refresh velocity of 31-59 pixels per second, etc.) can indicate that a user is skimming text or images of the digital document. Furthermore, a scroll speed that is above a threshold scroll speed (e.g., a content refresh velocity of 60 pixels per second or above, etc.) can indicate that a user is attempting to move to a different topic or section of the digital document. In some examples, the scroll speed can be monitored and/or determined in a background of the digital document to avoid displaying elements that may distract a user from content of the digital document.

In some examples, the scroll speed can be determined or calculated utilizing a reading speed of a particular user. For example, a particular user can have a reading speed that can be measured or determined in words per minute (WPM). In some examples, the reading speed can be determined by the computing device 102 and/or can be input into a user profile for a particular user. In some examples, the reading speed of a user can be altered based on feedback or user input. In some examples, the scroll speed can be determined utilizing words per line (WPL) of the text document. In some examples, the threshold speed can be altered based on received feedback from a user. In some examples, the feedback can include a number of received setting changes and/or inputs from a user. In some examples, the feedback can include inputs from a user when the image flow is displayed. For example, it can be determined that the user does not want the image flow to be displayed when the same topic is selected from the image flow. In this example, selecting the same topic that was previously displayed on the user interface can indicate that the scroll speed threshold should be increased such that unwanted image flow generation is avoided.

In some examples, the words per line can be different for a plurality of different text documents. Thus, the words per line for a text document can be determined for a text document that is displayed on the user interface. In some example, a line height (LH) for the text document displayed on a user interface can be determined by the computing device 102. In some examples, the scroll speed (SS) or threshold scroll speed can be calculated utilizing Equation 1. For example, the reading speed of a user in words per minute (WPM) can be multiplied by the line height (LH). In this example, the value of the WPM multiplied by the LH can be divided by the product of the words per line (WPL) and 60 of the displayed text document. In this way, the scroll speed can be for a particular text document with specific properties (e.g., words per line of the text document, line height of the text document, etc.). In some examples, the words per line and the line height of the text document can be the average words per line and/or the average line height of the text document.

$$SS=(WPM*LH)/(60*WPL) \qquad \text{Equation 1}$$

In a specific example, the words per line (WPL) can be 20, the line height (LH) can be 30 pixels. In this example, the scroll speed (SS) can be 30 pixels per second when the reading speed is 1200 words per minute (WPM). In this example, Equation 1 can be $(1200*30)/(60*20)=30$.

In some examples, the memory resource 106 can include instructions 110 to receive a selection of a topic header from the plurality of topic headers. In some examples, the image flow of the plurality of topic headers can be selectable. For example, the topic header from the plurality of topic headers can be selected by a peripheral device (e.g., computing mouse, etc.) and/or a touch screen of the computing device. In some examples, the selection of the topic header from the plurality of topic headers can instruct the computing device to display additional information corresponding to the topic header. For example, a card of the image flow can include a title "authenticate and get a user's profile details". In this example, the card can be selected and additional information relating to the topic title can be displayed on the user interface. In some examples, a first selection of the card can display a brief description or portion of the additional information relating to the topic of the title and a second selection of the card can navigate the digital document to the topic corresponding to the card.

In some examples, the selection of the topic header can remove the displayed image flow of the plurality of topic headers from the display to the background. For example, when a user selects a card of the image flow, the image flow can disappear to reveal the digital document. In some examples, the image flow can disappear to reveal the portion of the digital document that corresponds to the title of the selected topic. In some examples, the memory resource 106 can include instructions to stop display of the image flow upon selection of a topic header. In some examples, the image flow can be displayed again when the scroll speed exceeds the threshold scroll speed as described herein.

In some examples, the memory resource 106 can include instructions 112 to display, on a user interface, a portion of the document that corresponds to the selected topic header from the plurality of topic headers. In some examples, the portion of the document that corresponds to the selected topic can include a first portion of the document in response to a first selection and can include a second portion of the document in response to a second selection. For example, a first selection of the topic or topic card can display a brief description or a first few text lines of the digital document corresponding to the topic displayed on the topic card below the topic title. In this example, the second selection of the topic or topic card can remove the image flow of the plurality of topic headers from the display to display the corresponding portion of the digital document.

The computing device 102 can be utilized to more easily navigate digital documents utilizing a user interface coupled to the computing device 102. In some examples, the computing device 102 can be utilized to display an image flow of the plurality of topics of the digital document when it is determined that a scroll speed exceeds a threshold scroll speed and remove the image flow of the plurality of topics upon selection of a particular topic and/or when it is determined that a scroll speed is below the threshold scroll speed.

Figure 2:
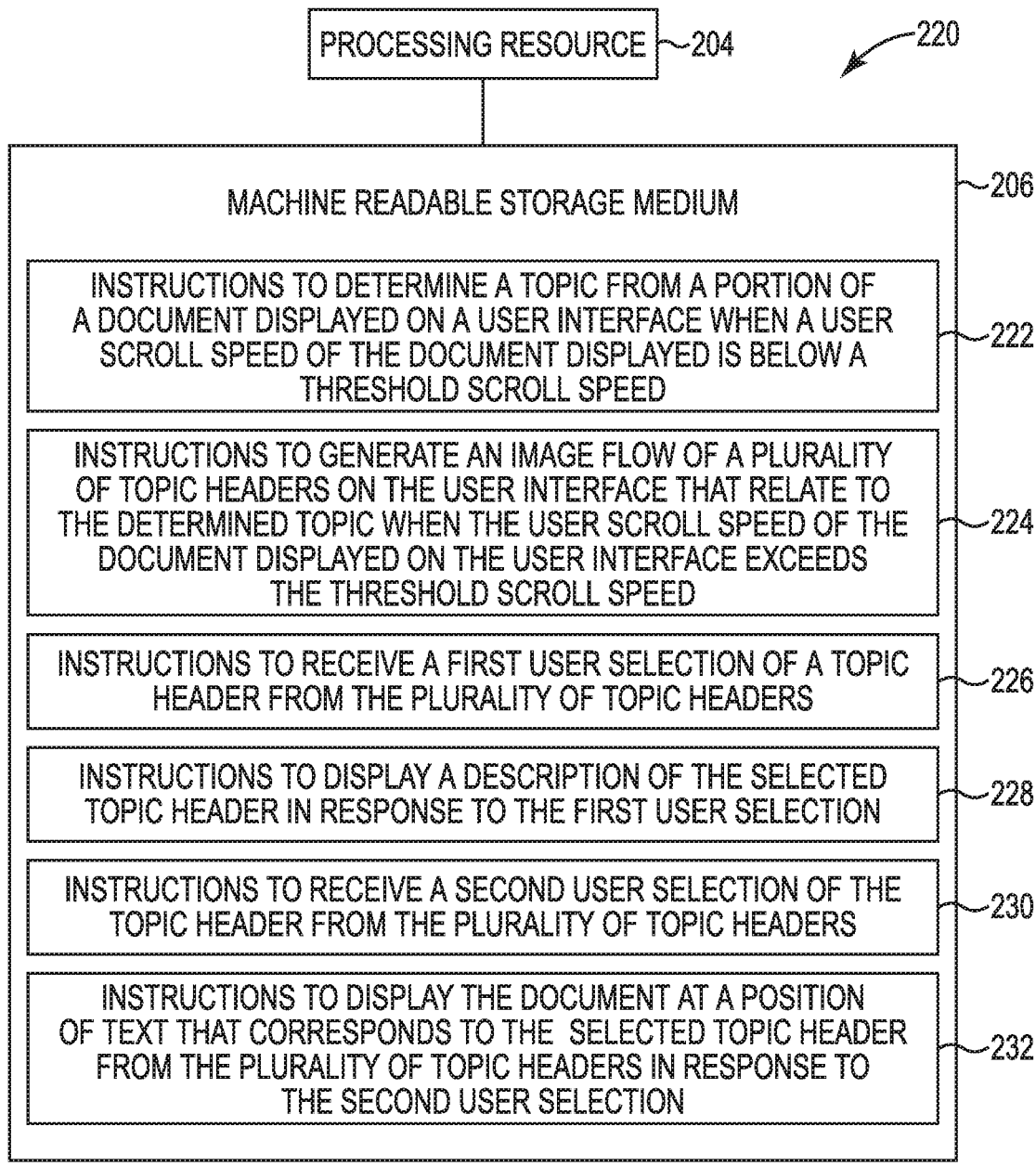
FIG. 2 illustrates an example of a system for topic image flows consistent with the present disclosure.

FIG. 2 illustrates an example of a system 220 for topic image flows consistent with the present disclosure. In some examples, the system 220 can include a machine readable storage medium 206 that can be utilized to store instructions 222, 224, 226, 228, 230, 232 that can be executed by a processing resource 204 to perform functions described herein.

A processing resource 204 may be a central processing unit (CPU), microprocessor, and/or other hardware device suitable for retrieval and execution of instructions stored in machine readable storage medium 206. In some examples, the processing resource 204 can be coupled to the machine readable storage medium 206 via a connection. The connection can be a physical or wireless communication connection. In the particular example shown in FIG. 2, processing resource 204 may receive, determine, and send instructions 222, 224, 226, 228, 230, 232. As an alternative or in addition to retrieving and executing instructions 222, 224, 226, 228, 230, 232, processing resource 204 may include an electronic circuit comprising a number of electronic components for performing the operations of the instructions 222, 224, 226, 228, 230, 232 in the machine readable storage medium 206. With respect to the executable instruction representations or boxes described and shown herein, it should be understood that part or all of the executable instructions 222, 224, 226, 228, 230, 232 and/or electronic circuits included within one box may be included in a different box shown in the figures or in a different box not shown.

Machine readable storage medium 206 may be any electronic, magnetic, optical, or other physical storage device that stores executable instructions 222, 224, 226, 228, 230, 232. Thus, machine readable storage medium 206 may be, for example, Random Access Memory (RAM), an Electrically-Erasable programmable Read-Only Memory (EEPROM), a storage drive, an optical disc, and the like. The executable instructions 222, 224, 226, 228, 230, 232 may be stored on the machine readable storage medium 206. Machine readable storage medium 206 may be a portable, external or remote storage medium, for example, that allows the system to download the instructions 222, 224, 226, 228, 230, 232 from the portable/external/remote storage medium. In this situation, the executable instructions 222, 224, 226, 228, 230, 232 may be part of an "installation package". As described herein, machine readable storage medium 206 may be encoded with executable instructions 222, 224, 226, 228, 230, 232 for remote device configurations as described herein.

In some examples, the machine readable storage medium 206 can include instructions 222 to determine a topic from a portion of a document displayed on a user interface when a user scroll speed of the document is below a threshold scroll speed. In some examples, it can be determined that a user is reading text or attempting to comprehend text or images of the document when the scroll speed of the document is below the threshold scroll speed. For example, a scroll speed below 60 pixels per second can indicate that a user is either skimming text or reading to comprehend text of the document. In this example, the scroll speed below 60 pixels per second can indicate an interest in the particular text.

In some examples, a topic of the particular text of interest can be determined and utilized to determine similar topics within the document. In some examples, determining similar topics within the document can be utilized to generate an image flow that only includes similar topics to the determined topic of interest. In this way, a user can more easily explore related topics compared to scrolling through the entire document.

In some examples, the machine readable storage medium 206 can include instructions 224 to generate an image flow of a plurality of topic headers on the user interface that relate to the determined topic when the user scroll speed of the document displayed on the user interface exceeds the threshold scroll speed. As described herein, the image flow of the plurality of topic headers can include a 3D visualization of a plurality of cards that each include a title of a corresponding topic. In some examples, the image flow of the plurality of topic headers can display a portion of selectable cards that can be scrolled through to view each of the plurality of topics of a digital document.

In some examples, the image flow of the plurality of topic headers can relate to the determined topic. For example, the determined topic can be a topic that is displayed on the user interface when the scroll speed exceeds the threshold scroll speed. In some examples, the machine readable storage medium 206 can include instructions to determine related topics for each of the plurality of topics within the digital document. The related topics can include similar terms and/or similar descriptions that may be relevant to a particular topic. In some examples, a text crawler can be utilized to identify similar text or similar descriptions. In some examples, the digital document can include outlines or other descriptions that can be utilized to identify relevant or related topics for each of the plurality of topics within the digital document.

In some examples, the machine readable storage medium 206 can include instructions 226 to receive a first user selection of a topic header from the plurality of topic headers. In some examples, the first selection of the topic header can be a selection from a peripheral device (e.g., selection of a computing mouse, selection on a touch screen user interface, etc.). In some examples, a first selection can be a single selection. For example, the first selection can be a single mouse selection from a computing mouse or a single touch on a touch screen of the user interface.

In some examples, the machine readable storage medium 206 can include instructions 228 to display a description of the selected topic header in response to the first user selection. In some examples, the first selection can initiate a first response of the image flow of the plurality of topics. For example, the first selection can initiate a full view of the card corresponding to the selected topic header. For example, each of the plurality of topic headers can include a corresponding brief description under the topic header or topic title. In some examples, the brief description or description of the selected topic can be a generated description of the topic and/or a particular quantity of text lines from the document corresponding to the selected topic. For example, a particular topic can include a plurality of paragraphs within the digital document. In this example, the first five lines can be displayed on the card upon the first selection to give a brief description of what is included within the digital document that corresponds to the selected topic header.

In some examples, the machine readable storage medium 206 can include instructions 230 to receive a second user selection of the topic header from the plurality of topic headers. In some examples, the second selection of the topic header can be a selection from a peripheral device (e.g., selection of a computing mouse, selection on a touch screen user interface, etc.). In some examples, a second selection can be a double selection. For example, the second selection can be a double mouse selection from a computing mouse or a double touch on a touch screen of the user interface. In some examples, the second selection can be a selection of the full view card corresponding to the first selection of the topic header. For example, when a topic header is selected from the image flow of the plurality of topics, a card corresponding to the topic can be displayed. In this example, the card can include the topic title and a brief description of the topic. In this example, the card can be selected, which can act as the second selection of the topic header from the plurality of topic headers within the image flow. In some examples, the second selection of the topic header can remove the image flow of the plurality of topic headers from the user interface and display the digital document at a particular position.

In some examples, the machine readable storage medium 206 can include instructions 232 to display the document at a position (e.g., start position) of text that corresponds to the selected topic header from the plurality of topic headers in response to the second user selection. In some examples, each of the plurality of topic headers of the image flow can include a link to the start position of text that corresponds to the selected topic. For example, the digital document can include a plurality of titles or headers to identify when a new topic is being discussed. In this example, the start position of the text can be a corresponding title within the digital documents. In some examples, the plurality of titles or headers can be the same as the topic headers utilized to generate the image flow.

In some examples, the machine readable storage medium 206 can include instructions to determine a different topic from a different portion of the document displayed on the user interface when the scroll speed of the document displayed is below a threshold scroll speed. In addition, the machine readable storage medium 206 can include instructions to add topic headers to the plurality of topic headers that relate to the determined different topic when the scroll speed of the document displayed on the user interface exceeds the threshold scroll speed. In some examples, the machine readable storage medium 206 can include instructions to remove the plurality of topic heaters that relate to the first determined topic when the topic headers are added to the plurality of topic headers upon the determination of the different topic.

Figure 3:
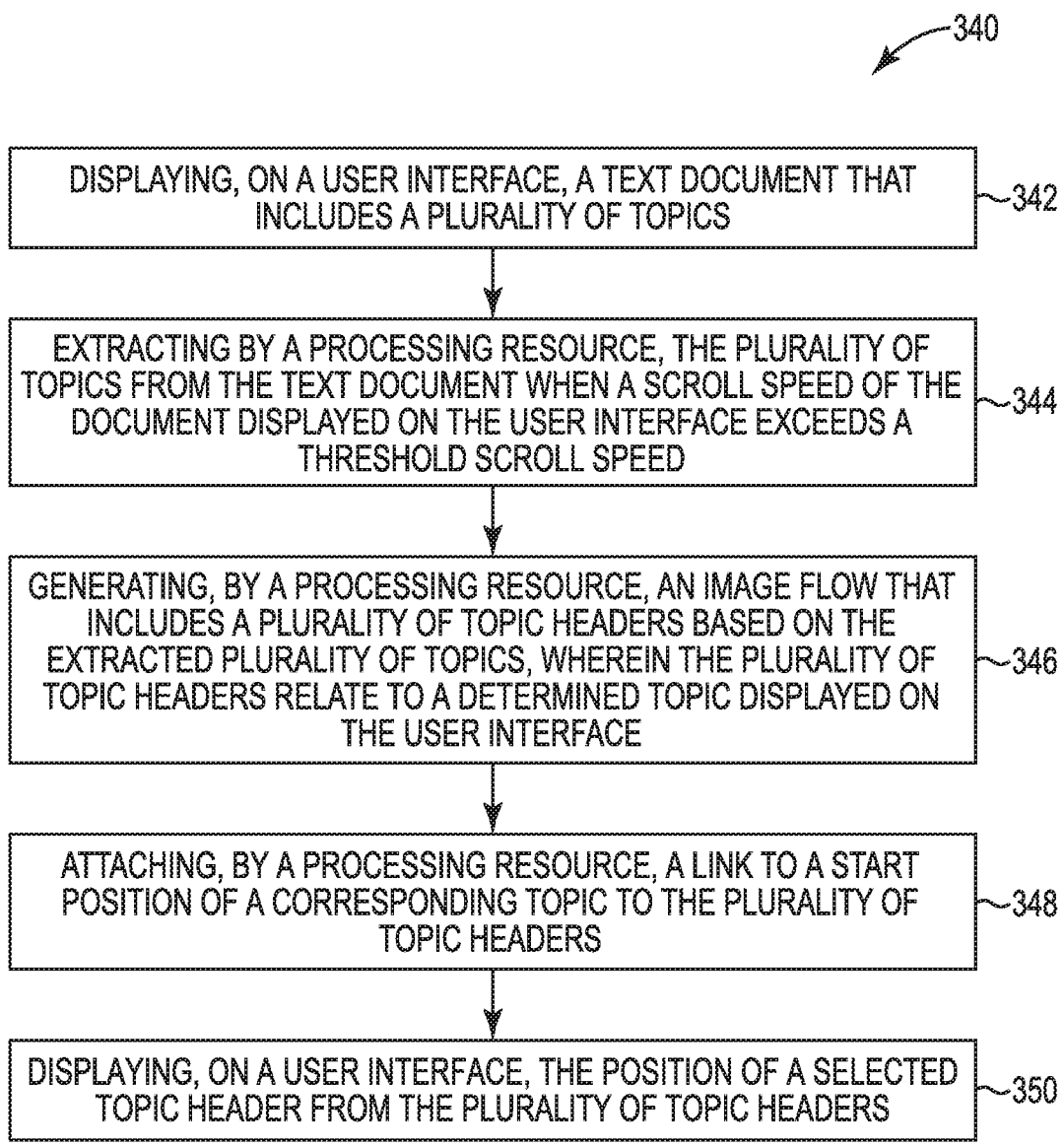
FIG. 3 illustrates an example of a method for topic image flows consistent with the present disclosure.

FIG. 3 illustrates an example of a method 340 for topic image flows consistent with the present disclosure. In some examples, the method 340 can be performed by one or more computing devices. For example, the method 340 can be performed by a computing device 100 as referenced in FIG. 1 and/or or a system 220 as referenced in FIG. 2, as described herein. In some examples, the computing device 100 as referenced in FIG. 1 can be coupled to a user interface to display a digital document and/or an image flow as described herein.

At block 342, the method 340 can include displaying, on a user interface, a text document that includes a plurality of topics. As described herein, a text document can be a digital document that includes text and/or images, but at least text. In some examples, the plurality of topics can correspond to a plurality of titles or headers within the text document. In some examples, the digital document can be positioned on a main portion of the user interface. In some examples, the digital document can be positioned in a full screen view such that the digital document is the only thing displayed on the user interface to allow a user to more easily read or skim the text and/or images of the text document.

At block 344, the method 340 can include extracting the plurality of topics from the text document when a scroll speed of the document displayed on the user interface exceeds a threshold scroll speed. In some examples, extracting the plurality of topics from the text document can include extracting titles and/or headers from a digital document that includes text. In some examples, method 340 can include crawling the text document with a text crawler to identify a plurality of topics from the text document. In some examples, extracting the plurality of topics from the text document can include extracting topic titles (e.g., outline titles, headers, etc.) from the text document.

In some examples, extracting the plurality of topics can include extracting topics from the text document that relate to a topic that is displayed prior to the scroll speed exceeding the threshold scroll speed. For example, a portion of the text document can be displayed on the user interface that includes text relating to troubleshooting a particular device. In this example, the method 340 can utilize a crawler to identify descriptions of troubleshooting similar devices, descriptions of the particular device, and/or other similarities between the portion of the text document displayed and the rest of the text document.

At block 346, the method 340 can include generating an image flow that includes a plurality of topic headers based on the extracted plurality of topics, wherein the plurality of topic headers relate to a determined topic displayed on the user interface. As described herein, an image flow of the plurality of topic headers can be generated. In some examples, the image flow of the plurality of topic headers can include 3D representation of a plurality of cards that each include a corresponding topic. In some examples, each of the plurality of cards can include a title with the topic and/or a brief description of the topic.

As described herein, the brief description of the topic can be a relatively small quantity of text lines from the text document that corresponds to the topic. For example, the brief description can include the first 5-10 lines of the of the topic discussion from the text document. In some examples, generating the image flow can include generating a plurality of visual cards with the plurality of topic headers displayed on the corresponding plurality of visual cards. For example, the image flow can include a 3D representation of a plurality of cards as described herein.

At block 348, the method 340 can include attaching a link to a start position of a corresponding topic to the plurality of topic headers. In some examples, the link to the start position can be positioned within or at a location of the card corresponding to the topic header. For example, the link can be a selectable link that can be positioned on the card, such that when the card is selected (e.g., via a second selection as described herein) the link can be activated. In some examples, the link may not be visible on the card of the corresponding topic. For example, the link can be embedded within the card such that selection of the card can indicate a selection of the link.

At block 350, the method 340 can include displaying the start position of a selected topic header from the plurality of topic headers. In some examples, displaying the start position of the selected topic header can include repositioning the text document to a particular page or paragraph where the topic of the selected topic header is located. In some examples, the start position of the selected topic can be a page or paragraph of the text document where a title of the topic is positioned.

In some examples, the method 340 can include determining a user intention based on the scroll speed of the document displayed on the user interface. In some examples, the user intention can be an intention to read the text document for comprehension, read the text document for skimming, and/or moving from one topic or part of the text document to a different topic or part of the text document.

Figure 4:
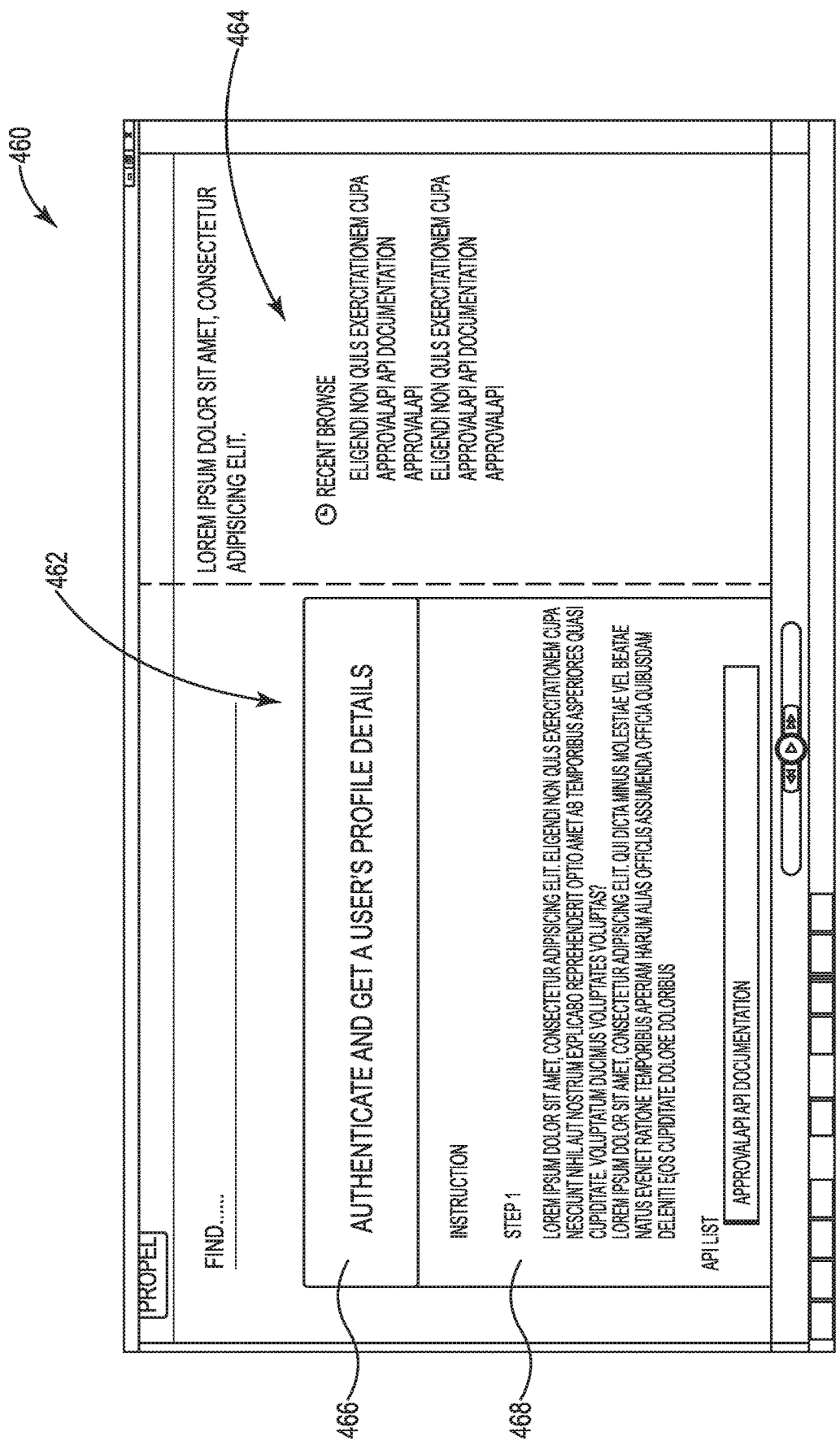
FIG. 4 illustrates an example of a user interface for topic image flows consistent with the present disclosure.

FIG. 4 illustrates an example of a user interface 460 for topic image flows consistent with the present disclosure. In some examples, the user interface 460 can be a computing display or computing monitor that is coupled to a computing device or system. For example, the user interface 460 can be coupled to a computing device 102 as referenced in FIG. 1 and/or the user interface 460 can be coupled to a system 220 as referenced in FIG. 2. In some examples, the user interface 460 can be utilized to display a text document 462 (e.g., digital document, word document with text, pdf document with text, etc.) and/or other tool bars 464.

In some examples, the user interface 460 can display a text document 462 that includes a title 466 and related text 468 that corresponds to the title 466. In some examples, the title 466 can correspond to a start of a particular topic and/or a start of the related text 468. For example, the title 466 can be a start of a particular topic. In this example, the title 466 of "authenticate and get a user's profile details" can be the start of a discussion relating to authenticating and getting a user's profile details.

In some examples, the title 466 can be utilized as a topic header for an image flow of a plurality of topic headers as described herein. For example, the image flow of the plurality of topic headers can include 3D representation of a plurality of cards. In this example, one of the plurality of cards can include a header titled "authenticate and get a user's profile details". In some examples, the card corresponding to the title 466 of the text document 462 can include a portion of the related text 468. For example, the card corresponding to the title 466 can include the first paragraph of the related text 468 that is positioned below the topic header of the card.

As described herein, when it is determined that a scroll speed of the text document 462 exceeds a scroll speed threshold an image flow of a plurality of topic headers can be displayed over the text document 462 as described further in reference to FIG. 5. In some examples, the scroll speed can be determined in the background of the user interface 460 to avoid distracting a user from being able to read and comprehend the text document 462.

FIG. 5 illustrates an example of a user interface 560 for topic image flows consistent with the present disclosure. In some examples, the user interface 560 can be a computing display or computing monitor that is coupled to a computing device or system. For example, the user interface 560 can be coupled to a computing device 102 as referenced in FIG. 1 and/or the user interface 560 can be coupled to a system 220 as referenced in FIG. 2. In some examples, the user interface 560 can be utilized to display a text document 562 (e.g., digital document, word document with text, pdf document with text, etc.) and/or other tool bars 564.

In some examples, the text document 562 can be positioned behind an image flow 565 of a plurality of topic headers 566-1, 566-2, 566-3, 566-N that correspond to topics of the text document 562. As described herein, the image flow 565 can be a 3D representation of a plurality of topic headers 566-1, 566-2, 566-3, 566-N displayed on a plurality of corresponding cards. As described herein, the plurality of cards or topic headers 566-1, 566-2, 566-3, 566-N can be selectable. For example, the topic header 566-1 can be selected to display a brief description of the topic corresponding to the topic header 566-1. As described herein, a first selection of the topic header 566-1 can display the card of the topic header 566-1 that includes the brief description and a second selection of the card of the topic header 566-1 can remove the image flow 565 from the user interface and display a start point or portion of the topic corresponding to the topic header 566-1.

As described herein, the image flow 565 can display a portion the plurality of topic headers 566-1, 566-2, 566-3, 566-N. For example, the image flow 565 can include one hundred or more topic headers. In this example, the image flow 565 can display seven to ten of the one hundred or more topic headers. In this way, a portion of the plurality of topic headers 566-1, 566-2, 566-3, 566-N can be displayed such that a portion of the plurality of topic headers 566-1, 566-2, 566-3, 566-N can be viewed at the same time. Displaying the portion of the plurality of topic headers 566-1, 566-2, 566-3, 566-N can be easier to navigate compared to displaying all of the plurality of topic headers 566-1, 566-2, 566-3, 566-N.

As described herein, the plurality of topic headers 566-1, 566-2, 566-3, 566-N can be a portion of a plurality of topics within the text document 562. For example, the plurality of topic headers 566-1, 566-2, 566-3, 566-N can include topics that relate to a topic that was displayed on the user interface 560 when a scroll speed exceeded a scroll speed threshold. The plurality of topic headers 566-1, 566-2, 566-3, 566-N can be easier to navigate by displaying a portion of the plurality of topics as the plurality of topic headers 566-1, 566-2, 566-3, 566-N instead of displaying topic headers for all of the plurality of topics within the text document 562. For example, a user can be researching a particular topic and may be interested in other topics that are related to the particular topic. In this example, the plurality of topic headers 566-1, 566-2, 566-3, 566-N can relate to the particular topic and topics that do not relate to the particular topic can be removed from the plurality of topic headers 566-1, 566-2, 566-3, 566-N or may not be generated with the plurality of topic headers 566-1, 566-2, 566-3, 566-N.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system, comprising:
a processing resource; and
a non-transitory computer readable medium having stored thereon instructions to cause the processing resource to:
generate an image flow of a plurality of topic headers when a user scroll speed of a document including text exceeds a threshold scroll speed;
receive a selection of a topic header from the plurality of topic headers; and
display, on a user interface; a portion of the document that corresponds to the topic header that is selected from the plurality of topic headers.

2. The system of claim 1, wherein the non-transitory computer readable medium comprises instructions to cause the processing resource to extract titles within the document that correspond to topics of the document.

3. The system of claim 2, wherein the image flow of the plurality of topic headers include a plurality of cards with a header that includes a corresponding title from the titles that are extracted.

4. The system of claim 1, wherein the non-transitory computer readable meidum comprises includes instructions to cause the processing resource to:
determine a topic based on text of the document being displayed; and
generate the plurality of topic headers in response to the topic.

5. The system of claim 4, wherein the plurality of topic headers are based on a relationship with the topic.

6. The system of claim 1, wherein the threshold scroll speed is based on a reading speed of a user, an average words per line of the document, and a line height of the document.

7. The system of claim 1, wherein the non-transitory computer readable medium comprises instructions to cause the processing resource to stop display of the image flow upon the selection of the topic header.

8. A non-transitory machine readable storage medium having stored thereon machine readable instructions to cause a computer processing resource to;
determine a topic from a portion of a document displayed on a user interface when a user scroll speed of the document is below a threshold scroll speed;
generate an image flow of a plurality of topic headers on the user interface that relate to the topic when the user scroll speed of the document displayed on the user interface exceeds the threshold scroll speed;
receive a first user selection of a topic header from the plurality of topic headers;
display a description of the topic header in response to the first user selection;
receive a second user selection of the topic header from the plurality of topic headers; and
display the document at a position of text that corresponds to the topic header from the plurality of topic headers in response to the second user selection.

9. The medium of claim 8, comprising instructions to alter the threshold scroll speed based on received feedback.

10. The medium of claim 8, wherein the description of the topic header includes extracted text from the position of text that corresponds to the topic header.

11. The medium of claim 8, wherein the image flow of the plurality of topic headers is not displayed on the user interface prior to the user scroll speed exceeding the threshold scroll speed.

12. The medium of claim 8, comprising instructions to:
determine a second topic from a different portion of the document displayed on the user interface when the user scroll speed of the document displayed is below the threshold scroll speed;
add topic headers to the plurality of topic headers that relate to the second topic when the user scroll speed of the document displayed on the user interface exceeds the threshold scroll speed.

13. The medium of claim 12, comprising instructions to remove the plurality of topic headers that relate to the topic.

14. The medium of claim 8, comprising instructions to determine the user scroll speed of the document in a background of the document.

15. A method, comprising:
displaying, on a user interface, a text document that includes a plurality of topics;
extracting, by a processing resource, the plurality of topics from the text document when a scroll speed of the text document displayed on the user interface exceeds a threshold scroll speed;
generating, by the processing resource, an image flow that includes a plurality of topic headers based on the plurality of topics that is extracted, wherein the plurality of topic headers relate to a determined topic displayed on the user interface;
attaching, by the processing resource, a link to a position of a corresponding topic to the plurality of topic headers; and
displaying, on the user interface, a position of a selected topic header from the plurality of topic headers.

16. The method of claim 15, wherein generating the image flow includes generating a plurality of visual cards with the plurality of topic headers displayed on the corresponding plurality of visual cards.

17. The method of claim 15, wherein extracting the plurality of topics from the text document includes extracting topic titles from the text document.

18. The method of claim 15, wherein attaching the link includes attaching the link to a position of an extracted title of the corresponding topic.

19. The method of claim 15, wherein displaying the position of the selected topic header includes removing the image flow from the user interface and monitoring the scroll speed in a background of the text document.

20. The method of claim 15, wherein monitoring the scroll speed in a background of the text document includes monitoring the scroll speed without indicating that the scroll speed is being monitored.

* * * * *